US006855260B1

(12) United States Patent
Yoon

(10) Patent No.: US 6,855,260 B1
(45) Date of Patent: Feb. 15, 2005

(54) METHODS OF ENHANCING FINE PARTICLE DEWATERING

(76) Inventor: Roe-Hoan Yoon, 2909 Wakefield Dr., Blacksburg, VA (US) 24060

( * ) Notice: Subject to any disclaimer, the term of this patent is extended or adjusted under 35 U.S.C. 154(b) by 0 days.

(21) Appl. No.: 09/327,266

(22) Filed: Jun. 7, 1999

(51) Int. Cl.$^7$ .............................................. B01D 37/02
(52) U.S. Cl. ........................... 210/727; 34/338; 44/626; 209/5; 210/728; 210/729; 210/732; 210/770; 210/778
(58) Field of Search .............................. 44/626; 209/5; 34/338, 348, 349; 210/725, 727, 728, 729, 732, 770, 772, 777, 771, 748, 778

(56) References Cited

U.S. PATENT DOCUMENTS

| | | | |
|---|---|---|---|
| 1,064,723 A | 6/1913 | Greenway et al. | |
| 1,102,873 A | 7/1914 | Chapman et al. | |
| 1,208,171 A | 12/1916 | Lavers et al. | |
| 2,120,217 A | 6/1938 | Harris ........................ | 209/166 |
| 2,864,765 A | 12/1958 | Stoneman et al. | |
| 3,880,824 A | 4/1975 | Rao et al. .................... | 260/112 |
| 4,039,466 A | 8/1977 | Matsuda et al. | |
| 4,156,649 A | 5/1979 | Quinn et al. | |
| 4,191,655 A | 3/1980 | Quinn et al. | |
| 4,206,063 A | 6/1980 | Wang et al. | |
| 4,207,186 A | 6/1980 | Wang et al. | |
| 4,210,531 A | 7/1980 | Wang et al. | |
| 4,278,208 A | 7/1981 | Falcon-Steward ............ | 241/16 |
| 4,410,431 A | 10/1983 | Roe | |
| 4,447,344 A | 5/1984 | Roe | |
| 4,507,198 A | 3/1985 | Unger et al. ................ | 209/166 |
| 4,561,953 A | 12/1985 | Muralidhara et al. .... | 204/182.3 |
| 4,770,766 A | 9/1988 | Keller, Jr. et al. | |
| 4,866,856 A | 9/1989 | Feeley ............................. | 34/9 |
| 4,909,946 A * | 3/1990 | Sanner ....................... | 210/728 |
| 4,969,928 A | 11/1990 | Wen et al. | |
| 5,011,612 A | 4/1991 | Keeney | |
| 5,048,199 A | 9/1991 | Cole | |
| 5,161,694 A | 11/1992 | Yoon et al. .................... | 209/5 |
| 5,167,831 A | 12/1992 | Diamas | |
| 5,215,669 A | 6/1993 | Koester et al. | |
| 5,256,169 A | 10/1993 | Roe | |
| 5,283,322 A | 2/1994 | Martin et al. ............... | 530/374 |
| 5,346,630 A | 9/1994 | Kenney | |
| 5,379,902 A | 1/1995 | Wen et al. | |
| 5,405,554 A | 4/1995 | Neff et al. | |
| 5,458,786 A | 10/1995 | Yoon et al. | |
| 5,520,822 A * | 5/1996 | Sun ........................... | 210/748 |
| 5,544,760 A | 8/1996 | Benn et al. .................. | 209/166 |
| 5,587,085 A | 12/1996 | Yoon et al. | |
| 5,587,786 A | 12/1996 | Champagne et al. ....... | 356/121 |
| 5,603,841 A * | 2/1997 | Kerr ........................... | 210/727 |
| 5,670,056 A | 9/1997 | Yoon et al. | |
| 5,700,904 A | 12/1997 | Baker et al. ................ | 530/305 |
| 5,814,210 A * | 9/1998 | Yoon et al. .................. | 209/164 |
| 6,375,853 B1 | 4/2002 | Yoon .......................... | 210/727 |
| 6,526,675 B1 * | 3/2003 | Yoon ........................... | 34/424 |

FOREIGN PATENT DOCUMENTS

| | | | |
|---|---|---|---|
| WO | WO97/25149 | 7/1997 | .......... B03D/1/012 |
| WO | WO00/09268 | 2/2000 | ............ B03D/1/02 |

OTHER PUBLICATIONS

Brooks and Bethel, "Zeta Potential, Contact Angle and the Use of Amines in the Chemical Dewatering of Fine–Floated Coal," Powder Technology, vol. 40, pp. 207–214, 1984.

Groppo, J.G. and Parekh, B.K., "Surface Chemical Control of Ultra–Fine Coal to Improve Dewatering," Coal Preparation, vol. 17, pp. 103–116, 1996.

Meenan, G.F., "Fine Coal Dewatering Equipment," Proceedings of the Industrial Practice of Fine Coal Processing, R.R. Klimpel and P.T. Luckie, eds., Society of Mining Engineers, Inc., pp. 223–229, 1988.

Singh, B.P., "The Influence of Surface Phenomena on the Dewatering of Fine Clean Coal," Filtration and Separation, pp. 159–163, Mar., 1977.

Smith, R.W., "Coadsorption of Dodecylamine Ion and Molecule on Quartz," Transactions of Americal Institute of Mining Engineers, vol. 266, pp. 427–433, 1963.

Yoon and Ravishankar, "Long–Range Hydrophobic Forces between Mica Surfaces in Dodecylammonium Chloride Solutions in the Presence of Dodecanol," J. Colloid and Interface Science, vol. 179, pp. 391–402, 1996.

Roe–Hoan Yoon and S.A. Ravishankar, "Long–Range Hydrophobic Forces between Mica Surfaces in Alkaline Dodecylammonium Chloride Solutions" 1996, Journal of Colloid and Interfaces Science, 179, pp. 403–411.

(List continued on next page.)

Primary Examiner—Peter A. Hruskoci
(74) Attorney, Agent, or Firm—Grossman, Tucker, Perreault & Pfleger, PLLC

(57) ABSTRACT

A new method of improving the process of dewatering fine particulate materials is disclosed. In this method, an aqueous slurry of fine particles is treated with appropriate hydrophobizing reagents so that the particulate material becomes moderately hydrophobic with its water contact angle considerably below 90°. A low hydrophile-lipophile balance (HLB) number surfactant is then added to the slurry, so that the surfactant molecules adsorb on the moderately hydrophobic surface primarily by hydrophobic attraction and, thereby, increase its contact angle close to or above 90°. By virtue of the greatly enhanced hydrophobicity, the water molecules adhering to the surface are destabilized and removed more readily by a mechanical dewatering process. Any nonionic surfactant with its HLB number below about 15 may be used for the hydrophobicity enhancement. The surfactants may be used in conjunction with appropriate solvents such as light hydrocarbon oils and short-chain alcohols. The moisture reduction can be further improved by using appropriate electrolytes in conjunction with the low HLB surfactants, spraying surface tension lowering reagents onto the filter cake, subjecting the cake to a suitable vibratory means, and by using combinations thereof.

9 Claims, No Drawings

OTHER PUBLICATIONS

Laiqun Mao and Roe–Hoan Yoon, "Predicting flotation rates using a rate equation derived from first principles" 1997, International Journal of Mineral Processing, 51, pp. 171–181.

Roe–Hoan Yoon, Darrin H. Flinn and Yakov I. Rabinovich, "Hydrophobic Interactions between Dissimilar Surfaces" 1997, Journal of Colloid and Interface Science, 185, pp. 363–370.

* cited by examiner

METHODS OF ENHANCING FINE PARTICLE DEWATERING

BACKGROUND

In the mining industry, run-of-the-mine (ROM) ores are crushed and pulverized to detach (or liberate) the valuable components from waste rocks. Although ROM coal is rarely crushed, a significant portion is present as fine coal. The pulverized ores and fine coal are then separated using appropriate methods. One of the most widely used methods of separation is froth flotation. In this method, a pulverized ore (or fine coal) is mixed with water to form a slurry, to which surfactants known as collectors are added to render selected constituent(s) hydrophobic. For the case of processing higher-rank coals such as bituminous and anthracite coals, which are naturally hydrophobic as mined, no collectors may be necessary. When these materials are not sufficiently hydrophobic, hydrocarbon oils are added to enhance their hydrophobicity. The hydrophobized (or naturally hydrophobic) particles are then collected by the air bubbles introduced at the bottom of a flotation cell. It is believed that the bubble-particle adhesion is driven by hydrophobic attraction. The air bubbles laden with hydrophobic particle rise to the surface of the aqueous pulp, while hydrophilic particles not collected by the air bubbles exit the cell. Thus, flotation produces two products, i.e., floated and unfloated. The more valuable of the two is referred to as concentrate, and the valueless is referred to as tailings (or refuse).

The concentrates are dewatered before they can be further processed or shipped to consumers, while the tailings (or refuse) are discarded with or without extensive dewatering. The dewatering process consists of several steps. In the first step, a slurry is thickened to 35 to 75% solids in a large settling tank, while free water is removed from the top and recycled back to the plant. In the second step, the thickened pulp is subjected to a mechanical dewatering process, such as filtration or centrifugation, to further remove the water. However, this process is inefficient, particularly when the mineral (or coal) particles are fine. In general, the moisture content in the dewatered product increases with decreasing particle size, which indicates that the residual moisture is mostly due to the surface water, i.e., the water molecules that are strongly adhering to the surface. For sulfide mineral concentrates, the filtered products contain typically 12 to 18% moisture by weight. For coal, the residual moistures are higher (20 to 30% by weight) due to its low specific gravity. Very often, these products need to be further dewatered in a third and the most costly step, i.e., thermal drying, which may be an option for high priced materials. However, it is not so for low-priced commodities such as coal. Even for the high-priced materials, elimination of the third step has significant economic and environmental advantages.

At present, the costs of cleaning and dewatering fine coal (finer than 0.5 mm) are approximately 3 times higher than those for cleaning coarser coal. For this reason, it is often more economical to discard the fines, if the fine coal constitutes only a small fraction of the product stream. This is typically the case with many coal producers around the world. In the U.S. alone, it is estimated that approximately 2 billion tons of fine coal has been discarded in abandoned ponds, while approximately 500 to 800 million tons of fine coal have been discarded in active ponds. On a yearly basis, the U.S. coal producers discard approximately 30 to 50 million tons of fine coal to ponds. This represents a loss of valuable natural resources and causes significant losses of profit to coal producers. The U.S. coal producers are blessed in that the fines fractions constitute only 5 to 20% of their product streams. In countries where coals are more friable, the fines fractions can be in the 20 to 50% range. In this case, coal producers can no longer afford to discard the fines. It is unfortunate that there are no technologies available today, other than the costly thermal drying, to lower the moisture of coal fines.

The difficulty in dewatering fine particulate materials may be explained from first principles. Those skilled in the art consider that a filter cake consists of a series of capillaries of different radii, from which water is removed during the process of vacuum or pressure filtration. The water can be removed only when the pressure drop applied across the filter cake exceeds the pressure of the water present inside the capillaries. The pressure, $\Delta p$, in the capillary of radius, r, can be calculated using the Laplace equation:

$$\Delta p = \frac{2\gamma_{23}\cos\theta}{r}, \qquad [1]$$

in which $\gamma_{23}$ is the surface tension at the water 3 and air 2 interface and $\theta$ is the contact angle of the inner walls of the capillary under consideration. In filtration, the capillary wall is made of the surfaces of the particles in the cake, and the effective capillary radius decreases with decreasing particle size. The contact angle is the most widely used measure of particle hydrophobicity (water-hating property). In the cessile drop method, a drop of water is placed on the surface of interest and the angle is measured through the aqueous phase. Thus, the term contact angle used in the present invention refers to the water contact angle, which increases with increasing surface hydrophobicity. Eq. [1] suggests that the capillary pressure increases with decreasing capillary radius, which explains the difficulties encountered during the filtration of fine particles. If a filter cake contains capillaries of different radii, it would be more difficult to remove the water from the finer capillaries. At a given pressure drop applied across the filter cake, one can see that the water trapped in the capillaries that are smaller than certain critical radius ($r_c$) cannot not be removed. Thus, the moisture of a filter cake should be determined by the amount of the water trapped in the capillaries smaller than the critical capillary radius.

Eq. [1] suggests three ways of achieving low cake moistures during filtration. These include i) surface tension lowering, ii) capillary radius enlargement, and iii) contact angle increase. Various chemicals (dewatering aids) are used to control these parameters. One group of reagents is the surfactants that can lower the surface tension. Most of the dewatering aids used for this purpose are ionic surfactants with high hydrophile-lipophile balance (HLB) numbers. Sodium laurylsulfate and sodium dioctylsulfosuccinate, whose HLB numbers are 40 and 35.3, respectively, are typical examples. Sing (*Filtration and Separation*, March, 1977, pp. 159–163) suggested that the former is an ideal dewatering aid for coal because it does not adsorb on the surface, which in turn allows for the reagents to be fully utilized for surface tension lowering. The U.S. Pat. No. 5,346,630 teaches a method of pressure spraying a solution of a dewatering aid from a position within the filter cake forming zone of a filter just prior to the disappearance of the supernatant process water. This method, which is referred to as torpedo-spray system, ensures even distribution of the dewatering aid without becoming significantly diluted by the supernatant process water.

It should be noted here that high HLB surfactants are also used as wetting agents for hydrophobic materials such as coal. Recognizing that dewatering is essentially a de-wetting process, it is difficult to see how one type of reagents can be used for both. It is well known that high HLB surfactants adsorb on hydrophobic non-wetting surfaces with inverse orientation, i.e., with hydrocarbon tails in contact with the surface and the polar heads pointing toward the aqueous phase. Thus, high HLB surfactants can lower the surface tension, but they can also dampen the hydrophobicity and decrease the contact angle. For this reason, the high HLB surfactants used as dewatering aids can actually cause an increase in moisture content. Furthermore, the reagents remaining in filtrate eventually return to the flotation circuit and cause adverse effects.

Various polymeric flocculants are used as dewatering aids. The role of these reagents is to increase the effective size of the particles in the filter cake, so that the pore radii are enlarged. This will greatly reduce the capillary pressure and, hence, increase the filtration rate. However, most of the flocculants used as dewatering aids are hydrophilic. Therefore, their adsorption dampens the hydrophobicity of the mineral or coal concentrates that are mildly hydrophobic by virtue of collector adsorption or by nature. Furthermore, the particles form small capillaries within each floc created by organic flocculants. Therefore, the method of using polymeric flocculants for dewatering has limitations. It has been reported that flocculants are capable of reducing dewatering rate but not necessarily the final cake moisture (Meenan, Proceedings of the Industrial Practice of Fine Coal Processing, Society of Mining Engineers, pp. 223–229, 1988).

Various electrolytes can also be used to coagulate the particles to be filtered, and improve dewatering. Groppo and Parekh (Coal Preparation, 1996, vol. 17, pp. 103–116) showed that fine coal dewatering improves considerably in the presence of divalent and trivalent cations. They found this to be the case when using cationic, anionic and nonionic surfactants.

The U.S. Pat. No. 5,670,056 teaches a method of using non-ionic (or neutral) low HLB surfactants and water-soluble polymers as hydrophobizing agents that can increase the contact angle above 65° and, thereby, facilitate dewatering processes. Mono-unsaturated fatty esters, fatty esters whose HLB numbers are less than 10, and water-soluble polymethylhydrosiloxanes were used as hydrophobizing agents. The fatty esters were used with or without using butanol as a carrier solvent for the low-HLB surfactants. This invention disclosure lists a group of particulate materials that can be dewatered using these reagents. These include coals, clays, sulfide minerals, phosphates, metal oxide minerals, industrial minerals and waste materials, most of which are hydrophilic without suitable pretreatment. The use of the low HLB surfactants disclosed in the U.S. Pat. No. 5,670,056 may be able to increase the contact angles of the minerals that are already hydrophobic, but not for the hydrophilic particles.

There are several other U.S. patents, which disclosed methods of using low HLB surfactants as dewatering aids. The U.S. Pat. Nos. 4,447,344 and 4,410,431 disclosed methods of using water insoluble nonionic surfactants with their HLB numbers in the range of 6 to 12. These reagents were used together with reagents (hydrotropes) that are capable of keeping the surfactants in solution or at the air-water interface rather than at the solid-liquid interface, so that they can be fully utilized in lowering surface tension. Thus, the role of the low HLB surfactants disclosed in this invention is different from that of the surfactants disclosed in the U.S. Pat. No. 5,670,056. They do not to adsorb on the surface of the particles and enhance their hydrophobicity. The low HLB surfactants, disclosed in the U.S. Pat. Nos. 4,447,344 and 4,410,431, are the reaction products of one mole equivalent of a primary alcohol containing 6 to 13 carbons with 2 to 7 mole equivalents of ethylene oxide.

The U.S. Pat. No. 2,864,765 teaches a method of using another nonionic surfactant, a polyoxyethylene ether of a hexitol anhydride partial long chain fatty acid ester, functioning alone or as a solution in kerosene. However, the disclosure does not mention that the nonionic surfactant increases the hydrophobicity of moderately hydrophobic particles. Furthermore, the compounds disclosed are essentially not adsorbed upon the solid surface of the ore particles and remain in the filtrate, as noted in the U.S. Pat. No. 4,156,649. In the latter patent and also in the U.S. Pat. No. 4,191,655, methods of using linear or branched alkyl ethoxylated alcohols as dewatering aids were disclosed. They were used in solutions of hydrocarbon solvents but in the presence of water-soluble emulsifiers such as sodium dioctylsulfosuccinate. As has already been discussed, the use of high HLB surfactants can dampen the hydrophobicity due to inverse orientation and increase the capillary pressure.

The U.S. Pat. No. 5,048,199 disclosed a method of using a mixture of a non-ionic surfactant, a sulfosuccinate, and a defoaming agent. The U.S. Pat. No. 4,039,466 disclosed a method of using a combination of nonionic surfactant having a polyoxyalkylene group and an anionic surfactant. The U.S. Pat. No. 5,215,669 teaches a method of using water-soluble mixed hydroxyether, which is supposed to work well on both hydrophobic (coal) and hydrophilic (sewage sludge) materials. The U.S. Pat. No. 5,167,831 teaches methods of using non-ionic surfactants with HLB numbers of 10 to 14. This process is useful for dewatering Bayer process alumina trihydrate, which is hydrophilic. The U.S. Pat. No. 5,011,612 disclosed methods of using $C_8$ to $C_{20}$ fatty acids, fatty acid precursors such as esters or amides, or a fatty acid blend. Again, these reagents are designed to dewater hydrophilic alumina trihydrate.

The U.S. Pat. No. 4,206,063 teaches methods of using a polyethylene glycol ether of a linear glycol with its HLB number in the range of 10 to 15 and a linear primary alcohol ethoxylate containing 12 to 13 carbon atoms in the alkyl moiety. These reagents were used to dewater mineral concentrates in conjunction with hydrophobic alcohols containing 6 to 24 carbon atoms. The composition of this invention was preferably used in conjunction with polymeric flocculants. Similarly, the U.S. Pat. No. 4,207,186 disclosed methods of using a hydrophobic alcohol and a non-ionic surfactant whose HLB number is in the range of 10 to 15.

It is well known that oils can enhance the hydrophobicity of coal, which is the reason that various mineral oils are used as collectors for coal flotation. The U.S. Pat. No. 4,210,531 teaches a method of dewatering mineral concentrates using a polymeric flocculant, followed by a combination of an anionic surfactant and a water-insoluble organic liquid. The use of flocculant and ionic surfactants may be beneficial in dewatering, but they could dampen the hydrophobicity of the particles and, hence, adversely affect the process. The U.S. Pat. No. 5,256,169 teaches a method to treat a slurry of fine coal with an emulsifiable oil in combination with an elastomeric polymer and an anionic and nonionic surfactant, dewatering the slurry and drying the filter cake, where the oil reduces the dissemination of fugitive dusts. The U.S. Pat. No. 5,405,554 teaches a method of dewatering municipal sludges, which are not hydrophobic, using water-in-oil emulsions stabilized by cationic polymers. The U.S. Pat. No. 5,379,902 disclosed a method of using heavy oils in conjunction with two different types of surfactants, floating the coal-emulsion mixture, dewatering the flotation product and drying them for reconstitution. The U.S. Pat. No. 4,969,928 also teaches a method of using heavy oils for dewatering and reconstitution.

The U.S. Pat. No. 4,770,766 disclosed methods of increasing the hydrophobicity of oxidized and low-rank coals using additives during oil agglomeration. The main objective this process is to improve the kinetics of agglomeration and ultimately the separation of hydrophilic mineral matter from coal. The additives disclosed in this invention include a variety of heavy oils and vegetable oils, alcohols containing 6 or more carbon atom, long-chain fatty acids, etc. When these additives were used, the product moisture was lower than would otherwise be the case. However, the process requires up 300 lb/ton of additives and uses 45 to 55% by volume of an agglomerant, which is selected from butane, hexane, pentane and heptane.

The U.S. Pat. No. 5,458,786 disclosed a method of dewatering fine coal by displacing water from the surface with a large amount of liquid butane. The spent butane is recovered and recycled. The U.S. Pat. No. 5,587,786 teaches methods of using liquid butane and other hydrophobic liquids for dewatering other hydrophobic particles.

OBJECTS OF THE INVENTION

From the foregoing, it should be apparent to the reader that one obvious object of the present invention is the provision of novel methods of decreasing the moisture of fine particulate materials during mechanical methods of dewatering processes such as vacuum and pressure filtration and centrifugation.

Another important objective of the invention is the provision of improving the rate at which water is removed so that given dewatering equipment can process higher tonnages of particulate materials.

An additional objective of the present invention is the provision of novel fine particle dewatering methods that can reduce the moisture to a level that no thermal drying is necessary.

Still another object of the instant invention is the provision of a novel dewatering method that creates no adverse effects on up and downstream processes when the water removed from the dewatering processes disclosed in the present invention is recycled.

SUMMARY OF THE INVENTION

The instant invention discloses methods of rendering the particulate materials suspended in water hydrophobic and/or enhancing the hydrophobicity of the materials, so that the process of removing the water by mechanical processes such as filtration and centrifugation are improved. The improvements will result in lower product moisture and/or higher throughput. The essence of the invention is to render the particles reasonably hydrophobic in the first place by suitable means and, then, add non-ionic low HLB surfactants to significantly enhance the hydrophobicity of the particulate materials, so that the pressures required to expel the moisture from smaller capillaries are reduced substantially. This will greatly increase the rate of dewatering and reduce the cake moisture.

Much of the hydrophobicity enhancing reagents disclosed in the present invention have HLB numbers below approximately 15, and are insoluble in water. Therefore, appropriate solvents such as light hydrocarbon oils and short-chain alcohols may be used in conjunction with the low-HLB surfactants. The light hydrocarbon oils, which should also be considered as HLB surfactants, may also act as hydrophobicity enhancing agents. Furthermore, the packages of the reagents used in the instant invention are capable of lowering surface tension. Also, the particles coagulate owing to the increased hydrophobicity and, thereby, increase the capillary radius. Thus, the reagent compositions disclosed in the present invention is capable of increasing contact angle, lowering surface tension, and enlarging capillary radius, all of which should contribute to decreasing capillary pressure and improving dewatering. The instant invention also discloses reagent dosage by adding cations, and achieving substantial moisture reduction by spraying reagents to filter cake and applying mechanical vibration during drying cycle time.

DETAILED DESCRIPTION OF THE INVENTION

In any mechanical dewatering process, the bulk of the water present in a feed stream can be removed easily. It is mainly the residual water adhering to the surface of the particles that is difficult to remove. Clear evidence for this is given by the fact that residual cake moistures are proportional to the specific surface area of the particulate materials, which in turn increases with decreasing particle size. Thus, the difficulty in removing the surface water may be considered to arise from the fact that water molecules are held strongly to the surface by hydrogen bonds. This would be particularly the case with hydrophilic particles, which by definition have an innate affinity to water. One may choose to break the H-bonds by subjecting the slurry to a heat or a very high mechanical force field created by centrifugation or pressure. However, these methods entail high energy costs and maintenance problems. A better option would be to destabilize the water molecules on the surface of the particles, so that they can be more readily detached (or liberated) from the surface and be subsequently removed by weaker mechanical forces. The present invention discloses methods of destabilizing the surface water by rendering the particles substantially more hydrophobic than usually required for the flotation of minerals and coal using appropriate surfactants and combinations thereof.

Thermodynamically, dewatering can be represented as a process in which a solid/liquid interface, whose interfacial tension is $\gamma_{12}$, is displace by an air/water interface, whose interfacial tension is $\gamma_{13}$. The free energy change, $\Delta G$, associated with the dewatering process can be obtained using the following relation:

$$\Delta G = \gamma_{13} - \gamma_{12}. \qquad [2]$$

If $\Delta G$ becomes negative, the dewatering process becomes spontaneous. The condition under which $\Delta G < 0$ can be found by considering the following relationship, which is known as Young's equation:

$$\gamma_{13} - \gamma_{12} = \gamma_{23} \cos\theta \qquad [3]$$

where $\gamma_{12}$ and $\gamma_{13}$ have the same meaning as in Eq. [2] and $\gamma_{23}$ represents the interfacial tension at the air/water interface. Substituting Eq. [3] into Eq. [2], one obtains the following relationship:

$$\Delta G = \gamma_{23} \cos\theta. \qquad [4]$$

Eq. [4] suggests that $\Delta G$ becomes negative, i.e., dewatering becomes spontaneous, when $\theta$ exceeds 90°. The same conclusion can be drawn from Eq. [1], which suggests that the capillary pressure becomes negative at obtuse contact angles.

The process of flotation is also based on hydrophobizing mineral particles. Appropriate collectors are used to render the surface hydrophobic so that air bubbles can displace the water that has become labile due to the hydrophobization from the surface and establish a three-phase contact. For the process of bubble-particle adhesion (or formation of three-phase contact) to be spontaneous, the following relationship must hold:

$$\Delta G = \gamma_{12} - \gamma_{13} - \gamma_{23} < 0 \quad [5]$$

Substituting Eq. [3] into Eq. [5], one obtains the following relationship:

$$\Delta G = \gamma_{23}(\cos \theta - 1) < 0, \quad [6]$$

which suggests that the condition for bubble-particle adhesion (or flotation) is θ>0. Comparing Eqs. [4] and [6], one can see clearly that the hydrophobicity requirement for flotation is much less than for dewatering. For this reason, flotation practitioners have been content with the degree of hydrophobicity obtained by using collectors. Practically all of the collectors used in industry today are designed to render minerals hydrophobic with contact angles well below 90°. At the same time, one can now see why dewatering mineral concentrates has been so difficult. The floated products are simply not hydrophobic enough for efficient dewatering.

If water contact angle is less than 90°, the process is no longer spontaneous. One must supply energy to the system to displace the surface water. Eq. [4] shows that the free energy requirement is reduced by lowering surface tension and by increasing contact angle. Of these two variables, control of contact angle is a more powerful means of reducing cake moisture, particularly if it can be increased above 45°. Consider a case where one can increase contact angle from 45 to 85° using appropriate means. This will reduce the energy requirement by 8.1 times. Likewise, the critical capillary radius ($r_c$) will be also reduced by 8.1 times, according to the Laplace equation (Eq. [1]). Let us now consider a case, where surface tension is lowered from 72 to 40 mN/m. This will reduce the energy requirement and $r_c$ by 1.8 times only. Note also that lowering the surface tension to 40 mN/m requires a large amount of surfactant, which can cause harmful effects such as hydrophobicity dampening (due to inverse orientation) and frothing problems.

In flotation, various collectors are used to render selected mineral constituents hydrophobic. The collectors adsorb on the surface with normal mode of orientation, i.e., with their polar heads in contact with the surface and their hydrocarbon tails pointing toward the aqueous phase. Thus, the collector molecules effectively coat the surface with hydrocarbon tails (or hydrophobes) that are hydrophobic. However, the hydrocarbon tails do not usually form a close-packed monolayer at the dosages normally employed in flotation practice. Even at high dosages, the hydrocarbon tails of collector molecules do not form close-packed monolayers. The reason is that the interaction between the polar heads and the surface are site specific and the number of reactive sites available on mineral surfaces are less than those required to form close-packed monolayers. For example, the number of negative charge sites available on mica surface is approximately one half of what is needed for dodecylammonium ions to form a close-packed monolayer. Thus, collector molecules usually form monolayers of sparsely populated hydrocarbon tails, the spaces between them being filled with water molecules. In such cases, contact angles are usually well below 90°. Such moderate hydrophobicity may be sufficient for flotation but not for spontaneous dewatering.

Smith (Transitions of AIME, vol. 226, pp.427–433, 1963) showed that the contact angles of silica were in the range of 15 to 30° in solutions of dodecylammonium hydrochloride at pH 6. When small amounts of dodecanol were added, the contact angle increased to 40 to 70°. Yoon and Ravishankar (J. Colloid and Interface Science, vol. 179, p. 391, 1996) reported similar results with mica immersed in dodecylammonium hydrochloride solutions containing small amounts of octanol or dodecanol. These investigators also showed that hydrophobic forces increased sharply at the contact angle of 90°.

In the instant invention, various non-ionic surfactants are used to increase the contact angle close to or above 90°, so that the efficiency of dewatering fine particulate materials is greatly improved. This is achieved by using various neutral (or nonionic) low HLB surfactants that may be useful for producing more complete monolayers. Part of the surfactants may adsorb in between the sparsely populated hydrocarbon tails and thereby increase the hydrocarbon chain density on the surface, which is conducive to hydrophobicity enhancement. Some of the surfactants may adsorb on top of the first monolayer of hydrophobes, which should also increase the hydrophobicity. Since the more hydrophobic moiety of a low HLB surfactant is attracted to the hydrophobes on the surface via hydrophobic interaction, the more polar part of the molecule may be exposed to the aqueous phase. However, such an orientation should not dampen the hydrophobicity significantly, because the polarity of the head groups of the low HLB surfactants disclosed in the present invention is much lower than that of high HLB surfactants.

On the less hydrophobic part of the surface, the low HLB surfactants disclosed in the instant invention may adsorb with their polar parts in contact with the surface, possibly via acid-base interactions. Such an adsorption mechanism will have the hydrocarbon tails point toward the aqueous phase, and thereby convert the less hydrophobic sites to more hydrophobic ones by covering the sites with hydrophobes.

The nonionic surfactants disclosed in the instant invention have HLB numbers below approximately 15. These include fatty acids, fatty esters, phosphate esters, hydrophobic polymers, ethers, glycol derivatives, sarcosine derivatives, silicon-based surfactants and polymers, sorbitan derivatives, sucrose and glucose esters and derivatives, lanolin-based derivatives, glycerol esters, ethoxylated fatty esters, ethoxylated amines and amides, ethoxylated linear alcohols, ethoxylated tryglycerides, ethoxylated vegetable oils, ethoxylated fatty acids, etc. Most of these reagents are insoluble in water; therefore, they are normally used in appropriate solvents, which are light hydrocarbon oils and short-chain alcohols whose carbon atom numbers are less than eight. The light hydrocarbon oils include diesel oil, kerosene, gasoline, petroleum distillate, turpentine, naphtanic oils, vegetable oils, etc.

The light hydrocarbon oils may also act as hydrophobicity enhancing reagents. In addition, both the light hydrocarbon oils and short chain alcohols may act as added surfactants that can lower the surface tension of water. This is possible because the surface tensions of the solvents used in the instant invention are in the range of 20 to 30 mN/m. Thus, the use of a low HLB surfactant in conjunction with a proper solvent addresses two of the three parameters that are important for improving dewatering, namely, contact angle increase and surface tension lowering. It seems that the dewatering aids disclosed in the instant invention also cause particles to coagulate by virtue of increased hydrophobicity. This phenomenon, known as hydrophobic coagulation, should increase the capillary radius and help dewatering. Evidence for the hydrophobic coagulation is given by the fact that cake thickness increases by approximately 10% in the presence of the dewatering aids. Therefore, combinations of the reagents used in the present invention is capable of controlling all three parameters suggested by the Laplace equation (Eq. [1]), i.e., contact angle, surface tension and capillary radius, to achieve maximum moisture reduction. High HLB surfactants and polymeric flocculants usually address one, and adversely affect the others, as has been discussed.

Although hydrophobic coagulation causes the capillary radius to increase, which is beneficial for dewatering, still another method of achieving the same is disclosed. In the instant invention, metal ions are added to coagulate particles, which has been found to drastically reduce the amount of the surfactants required to achieve a desired moisture reduction. Various metal ions can be used for this purpose. In general, the higher the valence of the cations, the smaller the amount of the amount of the reagents needed to obtain beneficial effects. The reagents can be added before, during or after the addition of the dewatering aids disclosed in the present invention.

Of the three parameters affecting dewatering, contact angle is probably the most important. In the instant invention, contact angle is increased by using low HLB surfactants in conjunction with light hydrocarbon oils and short-chain alcohols. The driving force for the adsorption mechanism is the hydrophobic attraction. Since the hydrophobic attraction exists only between two hydrophobic entities, it is necessary that the particles to be dewatered be rendered hydrophobic prior to or during the addition of the low HLB surfactants. For hydrophilic particles such as untreated silica and clay, they are hydrophobized by adsorbing appropriate surfactants on the surface. After the initial hydrophobization step, a low HLB surfactant can be added to further enhance the hydrophobicity for improved dewatering. The surfactants that can be used for the initial hydrophobization step are usually high HLB surfactants whose polar head groups can interact with the surface via coulombic attraction, chemical bonding, electron-transfer, or acid-base interactions, while their non-polar tails are directed toward the aqueous phase. When the fine particulate materials are naturally hydrophobic such as coal, the initial hydrophobization step may be eliminated. It could also be omitted for the mineral concentrates produced from flotation processes. If a mineral concentrate is aged or oxidized during storage and transportation, however, it is necessary that the surface is re-hydrophobized using appropriate amount of collectors (or other high HLB surfactants) before adding the low HLB surfactants.

The instant invention also discloses a method of decreasing the final cake moisture by applying appropriate vibration to the filter cake. It is possible that the vibration improves the transportation of the water that has become labile by increasing the hydrophobicity of the particulate materials to be dewatered. This technique is particularly useful for lowering the moisture from thicker cakes.

The instant invention discloses still another method of decreasing cake moisture. This technique involves spraying light hydrocarbon oils and short-chain alcohols on a filter cake, which is particularly useful for achieving low cake moisture with thick cakes. It is believed that these reagents decreases the surface tension of the residual water left in the filter cake. This technique is efficient in lowering the surface tension of the water that is most difficult to remove. Spraying low HLB surfactant on to a filter cake is also effective in achieving low cake moistures using very little incremental reagent consumption.

An added benefit of using the dewatering aids disclosed in the present invention is that the kinetics of mechanical dewatering is substantially improved, which will greatly increase the throughput of dewatering devices. Furthermore, the dewatering aids of the present invention have the characteristics of anti-forming agents, which is very important for processing the particulate materials produced from flotation processes. Also, most of the reagents added as dewatering aids and blends thereof adsorb on the surface of the particulate materials, so that the water removed from the dewatering process can be recycled without creating problems at the upstream processes.

TEST PROCEDURE

Many different samples were used for dewatering tests. These include a silica flower (−400 mesh), a Brazilian kaolin clay (90% finer than 2 $\mu$m), various coal samples from different sources and sulfide mineral concentrates. The first two were hydrophilic. Therefore, they were treated by a cationic surfactant to render the surface moderately hydrophobic. The hydrophobicity was further enhanced using a low HLB surfactant dissolved in a suitable light hydrocarbon oil before subjecting the sample to a dewatering test. When the sulfide mineral concentrates were received from Europe, they were superficially oxidized and became hydrophilic. As a means of regenerating fresh hydrophobic surface, they were re-floated using a thiol collector and methylisobutyl carbinol (MIBC) as a frother. The results obtained without the re-flotation step was relatively poor, indicating that the low HLB surfactants does not adsorb on the samples that have become hydrophilic due to oxidation during transportation.

Some of the coal samples were used as received. Most of the tests were conducted, however, after re-flotation using standard flotation reagents such as kerosene and MIBC. When a sample became hydrophilic due to aging and superficial oxidation during transportation, it was wet-ground in a ball mill for a short period of time to remove the oxidation products and regenerate fresh, moderately hydrophobic surface. This procedure helped the low HLB surfactants work better, indicating that they do not adsorb on hydrophilic surfaces. In order to eliminate the problems concerning oxidation, many tests were conducted using coarse coal products from the dense-medium circuit. These samples were crushed, pulverized, wet-ground in a ball mill, and floated using kerosene and MIBC. The flotation product was placed in a container and agitated continually. A known volume of the slurry was transferred to an Elenmeyer flask. A known amount of a dewatering aid was added to the flask before shaking it for 2 minutes. The conditioned slurry was then poured into a filter to initiate a filtration test. After a preset drying cycle time, the product was removed from the filter, dried in an oven for overnight, and then weighed to determine the cake moisture. During each test, cake formation time, which is the time it took for bulk of the water is drained, was recorded along with the cake thickness. For vacuum filtration, a 2.5-inch diameter Buchner funnel with medium porosity glass frit was used. To conduct tests at large cake thicknesses, the height of the Buchner filter was extended. For pressure filtration, a 2.5-inch diameter air pressure filter with cloth fabric medium was used to conduct tests under different pressures. It was made of Plexiglas so that the events taking place during filtration could be seen.

EXAMPLES

Example 1

In this example, sorbitan monooleate (Span 80), whose HLB number is 4.3, was used as a dewatering aid. Since the surfactant is insoluble in water, it was dissolved in a suitable solvent before use. In this example, dewatering tests were conducted with the surfactant dissolved in five different solvents, which included diesel oil, kerosene, fuel oil, gasoline, and butanol. Each test was conducted using one part by volume of the active ingredient dissolved in two parts of a solvent.

A 2.5-inch diameter Buchner funnel with medium porosity glass frit was used at 25-inch Hg vacuum pressure with 2 minute drying cycle time and 0.45-inch cake thickness. The tests were conducted on a Pittsburgh coal sample. It was a dense-medium clean coal product, which was crushed, ground, and screened to obtain a 0.5 mm×0 fraction. The fine coal sample prepared as such was floated using a laboratory flotation machine using 1 lb/ton of kerosene as collector and 75 g/ton of MIBC as frother. The flotation product was used as a feed to filtration tests. The feeds to filtration experiments were prepared each day to ensure that coal surface was fresh and moderately hydrophobic. Sorbitan monooleate and other low HLB surfactants disclosed in the present invention do not work well when samples are hydrophilic. Also, their performance deteriorates significantly when samples are oxidized to become partially hydrophilic.

Table 1 shows the results of the filtration experiments. Diesel oil and kerosene gave the best results. In general, mineral oils gave considerably better results than butanol, which was used as a solvent for mono-unsaturated fatty esters whose HLB numbers are less than 10 in the U.S. Pat. No. 5,670,056. At 3 to 5 lb/ton sorbitan monooleate, the moisture reductions were nearly 50%. Such results are far superior to what can be achieved using conventional dewatering aids that are designed to control surface tension.

TABLE 1

Effects of Using Sorbitan Monooleate with Various Solvents for the Vacuum Filtration of a Pittsburgh Coal (0.5 mm × 0) Sample

| Reagent Dosage | Cake Moisture (% wt) | | | | |
|---|---|---|---|---|---|
| (lbs/ton) | Diesel | Kerosene | Fuel Oil | Gasoline | Butanol |
| 0 | 25.7 | 25.7 | 25.7 | 25.7 | 25.7 |
| 1 | 15.1 | 15.0 | 16.6 | 16.3 | 17.2 |
| 3 | 13.8 | 13.7 | 14.8 | 14.5 | 15.8 |
| 5 | 12.5 | 13.4 | 14.2 | 14.2 | 15.3 |

Example 2

Sorbitan monooleate was used as a dewatering aid in the filtration of coal sample using diesel oil as a solvent. One part of the surfactant by volume was dissolved in two parts of the solvent before use. The coal sample used in this example was a 0.6 mm×0 flotation product from Blackwater coal preparation plant, Australia, which was received in the form of slurry. It was found, however, that the sample was considerably oxidized during transportation. As a means of regenerating fresh surface, the coal sample was wet-ground in a ball mill for 1.5 minutes, and re-floated using 1 lb/ton kerosene and 75 g/ton MIBC. The process of regenerating fresh surface and re-floating the pulverized coal, rendered the coal surface moderately hydrophobic, which appeared to be a prerequisite for the dewatering aids disclosed in the present invention to work more effectively.

The pressure filtration tests were conducted at different reagent additions, cake thickness, and air pressures. In each test, 2 minutes of conditioning time and 2 minutes of drying cycle time were employed. The results are given in Table 2. The reagent dosages given in this table refer to the active ingredient only. In general, the moisture reduction improves with increasing regent dosage, decreasing cake thickness, and increasing air pressure. At 200 kPa of air pressure, the cake moisture was reduced by nearly 50% at 0.85 inches of cake thickness and 5 lb/ton sorbitan monooleate.

TABLE 2

Effects of Using Sorbitan Monooleate for the Filtration of a Blackwater Coal (0.6 mm × 0) Sample at Different Air Pressures

| Applied Pressure | Reagent Addition | Cake Moisture (% wt) Cake Thickness (inch) | | |
|---|---|---|---|---|
| (kPa) | (lb/ton) | 0.25 | 0.50 | 0.85 |
| 100 | 0 | 27.5 | 29.5 | 30.1 |
|  | 1 | 17.3 | 21.6 | 22.5 |
|  | 3 | 12.8 | 15.8 | 18.4 |
|  | 5 | 9.4 | 14.6 | 16.7 |
| 200 | 0 | 24.5 | 26.2 | 27.8 |
|  | 1 | 13.2 | 14.6 | 19.4 |
|  | 3 | 8.4 | 11.9 | 16.4 |
|  | 5 | 7.9 | 10.5 | 14.2 |

Example 3

Sorbitan monooleate was also tested as a dewatering aid for zinc (sphalerite) concentrate. The sample (0.105 mm×0) was a flotation product, which was oxidized, however, during transportation. As a means of regenerating fresh hydrophobic surface, the sample was wet-ground in a ball mill for 1.5 minutes and re-floated using 50 g/ton sodium isopropyl of xanthate (NaIPX) and 50 g/ton MIBC. The flotation product was subjected to pressure filtration tests using a 2.5-inch diameter filter at 100 kPa of air pressure and 2 minutes of drying cycle time. The cake thickness was varied by changing the volume of the slurry used in the filtration tests. The results are given in Table 3. The % moisture reductions were 64.1, 54.8, and 52.8% at 0.2, 0.3 and 0.6 inches of cake thickness, respectively, at 3 lb/ton sorbitan monooleate. Moisture reduction did not further increase significantly at 5 lb/ton.

TABLE 3

Effects of Using Sorbitan Monooleate for the Filtration of a Zinc Concentrate (0.105 mm × 0) at 100 kPa of Air Pressure

| Reagent Dosage | Cake Moisture (% wt.) Cake Thickness (inch) | | |
|---|---|---|---|
| (lbs/ton) | 0.2 | 0.3 | 0.6 |
| 0 | 14.2 | 15.5 | 18.0 |
| 1 | 6.5 | 8.4 | 9.1 |
| 3 | 5.1 | 7.0 | 8.5 |
| 5 | 4.7 | 6.6 | 8.1 |

Example 4

Ethyl oleate is another low HLB number surfactant, which was tested as a dewatering aid in the present invention. This reagent was also used as a dewatering aid in the U.S. Pat. No. 5,670,056, in which butanol was used as a carrier solvent. In the present example, ethyl oleate was tested for the vacuum filtration of a 0.5 mm×0 Pittsburgh coal using mineral oils as solvents. The method of preparing the coal sample and the procedures employed for the filtration experiments were the same as described in Example 1. The results obtained with four different mineral oils are given in Table 4 and are compared with those obtained using butanol as a solvent. As shown, mineral oils produced considerably better results than butanol.

TABLE 4

Effects of Using Ethyl Oleate Mixed with Different Solvents on the Vaccum Filtration of a Pittsburgh Coal (0.5 mm × 0)

| Reagent | Cake Moisture (% wt) | | | | |
|---|---|---|---|---|---|
| Dosage (lb/ton) | Diesel | Kerosene | Fuel Oil No. 4 | Gasoline | Butanol |
| 0 | 26.4 | 26.4 | 26.4 | 26.4 | 26.4 |
| 1 | 16.6 | 16.6 | 17.2 | 17.0 | 18.7 |
| 3 | 14.2 | 14.5 | 15.4 | 14.7 | 16.5 |
| 5 | 13.3 | 13.4 | 14.1 | 13.8 | 15.7 |

Example 5

Ethyl oleate was used as a dewatering aid for the vacuum filtration of a bituminous coal sample from Elkview Mine, British Columbia, Canada. The sample was a 0.21 mm×0 flotation product, which was received as a slurry. It was oxidized during transportation; therefore, the sample was wet-ground in a ball mill for 1.5 minutes and re-floated using 1 lb/ton kerosene and 75 g/ton MIBC before filtration. A 2.5-inch diameter Buchner funnel was used at a vacuum pressure of 25 inches Hg and 2 min drying cycle time. The tests were conducted using different amounts of ethyl oleate dissolved in 33.3% solutions in diesel oil at 0.25 and 0.5 inches of cake thickness. At 5 lb/ton ethyl oleate, the moisture reductions were 71.3 and 57.4% at 0.25 and 0.5 inches of cake thickness, respectively.

TABLE 5

Effects of Using Ethyl Oleate for the Filtration of a 0.21 mm × 0 Elkview Coal Sample at 200 kPa of Air Pressure

| Reagent Dosage | Moisture Content (% wt) Cake Thickness (inch) | |
|---|---|---|
| (lbs/ton) | 0.25 | 0.50 |
| 0 | 24.0 | 26.3 |
| 1 | 10.3 | 15.2 |
| 3 | 7.8 | 12.6 |
| 5 | 6.9 | 11.2 |

Example 6

Ethyl oleate was tested as dewatering aid for a lead concentrate (0.074 mm×0) received from a flotation plant in Europe. One part by volume of the surfactant was dissolved in 2 parts of diesel oil before use. The sample, which was received as thickened slurry, was oxidized during transportation. To generate fresh, hydrophobic surface, the sample was wet-ground for 1.5 minutes and re-floated using 50 g/ton NaIPX and 50 g/ton MIBC before filtration. A 2.5-inch diameter Buchner funnel was used for filtration at a vacuum pressure of 25-inch Hg and at a drying cycle time of 2 minutes. The tests were conducted at various reagent additions and cake thicknesses. At 3 lb/ton ethyl oleate, the cake moisture was reduced to 6% at 0.6 inches of cake thickness. At such low moisture level, it would not be necessary to dry the concentrate further using a thermal drier.

TABLE 6

Effects of Using Ethyl Oleate for the Filtration of a Lead Concentrate (0.074 mm × 0) Sample at Varying Reagent Dosage and Cake Thickness

| Reagent Dosage | Moisture Content (% wt.) Cake Thickness (inch) | | |
|---|---|---|---|
| (lbs/ton) | 0.2 | 0.3 | 0.6 |
| 0 | 9.9 | 11.5 | 13.1 |
| 1 | 5.3 | 5.5 | 7.8 |
| 3 | 4.3 | 5.2 | 6.0 |
| 5 | 4.0 | 5.1 | 5.8 |

Example 7

Polymethylhydrosiloxanes (PMHS) were disclosed as dewatering aids in the U.S. Pat. No. 5, 670,056. However, this disclosure does not teach that better results can be obtained when the reagents are used after dissolving them in appropriate solvents. Table 7 shows the results of the vacuum filtration tests conducted using a PMHS whose molecular weight is 2,900 with and without using various solvents. The filtration tests were conducted on a Pittsburgh coal in the same manner as described in Example 1. The results show that use of suitable solvents significantly reduced the cake moisture. This would be particularly important when using hydrophobic polymers of high molecular weights.

TABLE 7

Effects of Using a PMHO with Molecular Weight of 2900 Dissolved in Different Solvents for the Vacuum Filtration of a Pittsburgh Coal (0.5 mm × 0)

| Reagent Dosage | Cake Moisture (% wt) | | | | | |
|---|---|---|---|---|---|---|
| (lb/ton) | Diesel | Kerosene | Fuel Oil | Gasoline | Butanol | None |
| 0 | 26.1 | 26.1 | 26.1 | 26.1 | 26.1 | 26.1 |
| 1 | 16.8 | 17.3 | 17.6 | 17.8 | 18.3 | 20.4 |
| 3 | 15.0 | 15.2 | 15.4 | 15.6 | 17.0 | 19.0 |
| 5 | 14.8 | 14.7 | 15.2 | 15.2 | 16.4 | 18.3 |

Example 8

Sorbitan monooleate with 20 polyoxyethlene (POE) groups (Tween 80) is a nonionic surfactant with its HLB number at 15, which is higher than those of other non-ionic surfactants disclosed in the present invention. Nevertheless, the reagent was not completely soluble in diesel. Therefore, one part by volume of the surfactant was mixed with two parts of diesel oil and one part of butanol before use. The nonionic surfactant dissolved in the mixed solvent was used as a dewatering aid for a bituminous coal (0.84 mm×0) from Massey Coal Company, West Virginia, using a 2.5-inch diameter pressure filter. The coal sample was a spiral product, which was wet-ground in a ball mill and floated using 1 lb/ton kerosene and 100 g/ton MIBC. The filtration experiments were conducted at 200 kPa air pressure by varying reagent addition and cake thickness at 2 min drying cycle time. The best results were obtained at 1 and 2 lb/ton. At 2 lb/ton Tween 80 and 0.8 inches cake thickness, the moisture reduction was 54.9%. At smaller cake thicknesses, higher levels of moisture reductions were achieved. Interestingly, the moisture reduction deteriorates at higher reagent dosages, which may be due to the inverse orientation of the surfactant molecules with their polar heads (EO groups) pointing toward the aqueous phase. Such orientation should make the surface less hydrophobic, which is detrimental to dewatering. The inverse orientation is possible with a nonionic surfactant with a relatively high HLB number, particularly with EO groups.

Vacuum filtration tests were also conducted using Tween 80 dissolved in diesel alone and in butanol alone. The results were not as good as those obtained using the mixed solvents as shown in Table 8.

TABLE 8

Effects of Using Sorbitan Monooleate with 20 EO Groups Dissolved in a Mixed Solvent for the Filtration of a Massey Coal (0.85 mm × 0) Sample at 200 kPa of Air Pressure

| Reagent Addition | Moisture Content (% wt.) Cake Thickness (inch) | | |
|---|---|---|---|
| (lb./ton) | 0.2 | 0.4 | 0.8 |
| 0 | 22.2 | 23.5 | 25.3 |
| 0.5 | 10.3 | 12.2 | 13.8 |
| 1 | 8.2 | 9.7 | 11.6 |
| 2 | 7.8 | 9.6 | 11.4 |
| 3 | 9.8 | 10.5 | 13.7 |

Example 9

Phosphate esters constitute an important group of low HLB surfactants. They can also be used as dewatering aids for coal and other mineral concentrates that are moderately hydrophobic. Table 9 shows the results obtained using tridecyldihydrogen phosphate (TDDP) (a phosphoric acid mono-tridecyl ester) as a dewatering aid in the vacuum filtration of a Pittsburgh coal (0.5 mm×0) sample. Various mineral oils and butanol were used as solvents for the low HLB surfactant. Mineral oils, particularly diesel oil and kerosene, gave better results than butanol. With diesel oil, the moisture reduction was 50%. The sample preparation and the experimental procedures employed were the same as described in Example 1. All of the filtration tests were conducted at a 0.45-inch cake thickness.

TABLE 9

Effects of Using Tridecyldihydrogen Phosphate (TDDP) for the Vacuum Filtration of a Pittsburgh Coal (0.5 mm × 0) Sample Using Various Solvents

| Reagent Dosage (lbs/ton) | Cake Moisture (% wt) | | | | |
|---|---|---|---|---|---|
| | Diesel | Kerosene | Fuel Oil No 4 | Gasoline | Butanol |
| 0 | 26.2 | 26.2 | 26.2 | 26.2 | 26.2 |
| 1 | 17.4 | 16.8 | 17.8 | 18.0 | 19.5 |
| 3 | 13.9 | 14.2 | 14.8 | 15.4 | 17.5 |
| 5 | 13.1 | 13.4 | 13.9 | 14.3 | 17.0 |

Example 10

The effectiveness of TDDP may be attributed to the likelihood that it enhances the hydrophobicity of coal. To confirm this possibility, contact angle measurements were conducted on a polished Pittsburgh coal sample, and the results are given in Table 10. Also shown for comparison are the results of the vacuum filtration tests conducted on the Pittsburgh coal sample and the surface tensions of the filtrate. The filtration tests were conducted using a 2.5-inch diameter Buchner funnel at 25-inch vacuum pressure, 2 minute drying cycle time, and 0.45-inch cake thickness. The sample was a dense-medium product, which was crushed and ground to obtain a 0.5 mm×0 fraction. The fine coal sample was floated using 1 lb/ton kerosene and 100 g/ton MIBC.

As shown, the reagent addition caused an increase in contact angle and a decrease in surface tension, both of which are conducive to improved dewatering. It is interesting that contact angle increased from 12° to 90° at 3 lb/ton. Thermodynamically, water should recede spontaneously from a solid surface when its contact angle exceeds 90°. The fact that water is still left in the cake at such high contact angle may be a reflection of the slow kinetics of transporting the water 'liberated' from the surface through filter cake. The primary role of the low HLB surfactants is to help liberate the water molecules adhering on the surface of coal by further increasing its hydrophobicity. Both the nonionic surfactant and the solvent may have contributed to the surface tension lowering.

It may be noteworthy that at 1 lb/ton kerosene the moisture was reduced from 28.4 to 25.3%, which is far less than the cases of using mixtures of TDDP and diesel oil. Even when the dosage of kerosene (or any other mineral or vegetable oil) was increased, the moisture reduction did not exceed more than 5%. When the kerosene dosage was increased to very large amounts, moisture content actually increased. This may be attributed to the likelihood that water traps within the floes of coal created in the presence of large amounts of oil. Only when judicious amounts of low HLB surfactants, such as TDDP and others disclosed in the present invention, are used in conjunction with appropriate solvents, significant moisture reductions can be achieved.

TABLE 10

Effects of TDDP on the Surface Chemistry Parameters for the Filtration of a Pittsburgh Coal Sample

| Reagent Type | Reagent Dosages (lb./ton) | Contact Angle (Degree) | Filtrate Surface Tension (mN/m) | Moisture Content (% wt) |
|---|---|---|---|---|
| None | 0 | 12 | 71 | 28.4 |
| Kerosene | 1 | 40 | 70 | 25.3 |
| TDDP | 1 | 74 | 67 | 16.2 |
| | 2 | 84 | 65 | 14.0 |
| | 3 | 90 | 61 | 12.8 |
| | 5 | 92 | 57 | 11.9 |

Example 11

A bituminous coal from Elkview Mine, British Columbia, Canada, was used for a series of pressure filtration tests using TDDP as dewatering aid. One part by volume of the reagent was dissolved in two parts of diesel oil before use. The tests were conducted using a 2.5-inch diameter pressure filter at 200 kPa air pressure and 2 min drying cycle time. The coal sample was a flotation product (0.21 mm×0) received as a slurry. The sample was re-floated using 1 lb/ton kerosene and 75 g/ton MIBC as a means of regenerating fresh, hydrophobic surfaces. The filtration tests were conducted at different cake thicknesses using different amounts of reagents. At 5 lb/ton TDDP and 0.25 inches cake thickness, the moisture was reduced from 25.8 to 5.8%, which represents a 77.5% reduction. The moisture was reduced to less than 10% even at 0.5 inches cake thickness.

TABLE 11

Effects of Using TDDP on the Filtration of an Elkview Coal at 200 kPa Air Pressure

| Applied Pressure | Reagent Dosage | Moisture Content (% wt) Cake Thickness (inch) | |
|---|---|---|---|
| (kPa) | (lbs/ton) | 0.25 | 0.50 |
| 200 | 0 | 25.8 | 27.1 |
| | 1 | 9.3 | 12.0 |
| | 3 | 7.4 | 10.4 |
| | 5 | 5.8 | 9.8 |

Example 12

Various ionic surfactants are used as dewatering aids for fine coal dewatering. Brooks and Bethel (1984) used cationic surfactants (amines) to obtain significant improvements in fine coal dewatering. It would, therefore, be of interest to compare the performance of the low HLB surfactants used in the present invention with those obtained using amines. Table 12 compares the results of the vacuum filtration tests conducted on a bituminous coal from the Middle Fork coal preparation plant, Virginia, using two different cationic surfactants (diaminecyclohexane and dodecylammonium chloride) of high HLB numbers and two different low HLB No. nonionic surfactants (sorbitan monooleate and TDDP). The coal sample was a dense-medium product, which was crushed and ground to obtain a 0.6 mm×0 fraction. All tests were conducted using a 2.5-inch diameter Buchner funnel at 25-inches Hg vacuum pressure, 2 min drying time, and 0.45-inches cake thickness. The results given in Table 12 show that the low HLB surfactants used in the manner disclosed in the present invention are substantially more efficient than the high HLB surfactants.

TABLE 12

Results of the Vacuum Filtration Tests Conducted on a Middle Fork Coal Sample Using High and Low HLB Surfactants

| Reagent Dosage | Cake Moisture (% wt) | | | |
|---|---|---|---|---|
| (lbs/ton) | Diamine | Dodecyleamine | Span 80 | TDDP |
| 0 | 22.6 | 22.6 | 22.6 | 22.6 |
| 0.5 | 20.6 | 19.1 | 16.5 | 16.9 |
| 1 | 20.5 | 18.6 | 15.0 | 15.3 |
| 2 | 19.7 | 17.9 | 12.6 | 12.2 |
| 3 | 19.8 | 17.4 | 11.4 | 11.1 |
| 5 | 20.9 | 17.1 | 10.9 | 10.2 |

Example 13

As discussed in Example 10, it is one thing to liberate the water molecules from the surface of the particles to be dewatered using low-HLB surfactants, but it is another to transport the liberated water droplets through a filter cake. The latter problem becomes more serious with thicker cakes. One way to minimize the second problem is to apply vibration during filtration. Therefore, a bituminous coal (0.6 mm×0) from Massey Coal Company was subjected to a series of vacuum filtration experiments, in which a 2.5-inch Buchner funnel was vibrated during the 5 min drying cycle time. The feed to the filtration tests was prepared in the same manner as described in Example 8. The vibration was created by placing an ultrasonic probe at the bottom part of the funnel. Varying amounts of sorbitan monooleate were used as dewatering aid at 0.25 and 0.5 inches of cake thicknesses. One part by volume of the surfactant was dissolved in two parts of diesel oil before use. The results, given in Table 13, show that very low levels of cake moisture can be achieved by combining the methods of using low HLB surfactants and mechanical vibration.

TABLE 13

Effects of Ultrasonic Vibration on the Vacuum Filtration of a Bituminous Coal (0.6 mm × 0) Using Sorbitan Monooleate

| Reagent Addition | Cake Moisture (% wt.) | | | |
|---|---|---|---|---|
| | 0.25 Inch Cake | | 0.5 Inch Cake | |
| (lb/ton) | w/o Vibration | w/ Vibration | w/o Vibration | W/ Vibration |
| 0 | 25.5 | 19.2 | 26.4 | 21.7 |
| 1 | 15.2 | 10.3 | 17.7 | 12.1 |
| 2 | 12.3 | 8.5 | 16.5 | 10.3 |
| 3 | 12.2 | 6.4 | 15.6 | 9.2 |
| 5 | 11.5 | 5.5 | 15.2 | 8.5 |

Example 14

As suggested by the Laplace equation, surface tension lowering is useful in decreasing capillary pressure and, hence, improving dewatering kinetics. Conventional wisdom is, therefore, to add surfactants to a feed slurry before it enters a filter. However, the bulk of the water present in the feed stream is easily removed at the beginning of a filtration process. It may be stated, therefore, that much of the surfactants added to the feed stream are wasted and do not contribute to reducing the final cake moisture. A more effective method of using a surfactant may be to add it when it is needed most, i.e., during drying cycle time. Some of the water trapped in finer capillaries is removed during drying cycle time. Therefore, a series of experiments were conducted in this example, in which different surface tension lowering reagents were sprayed over filter cake during drying cycle time.

Table 14 shows the results obtained by spraying approximately 2 lb/ton of butanol, ethanol, and diesel oil at the beginning of 2 min drying cycle time. The surface tensions of n-butanol and ethanol are 20.6 and 22.77 mN/m, respectively, at 20° C. The surface tension of diesel oil should also be low, as most other hydrocarbon liquids are. Therefore, spraying these reagents should lower the surface tension of the water left in filter cake and help reduce the moisture. The filtration experiments were conducted on a 0.6 mm×0 bituminous coal sample from Middle Fork, Va., at 0.45 inch cake thickness. Two sets of tests were conducted using sorbitan monooleate and TDDP as dewatering aids. When using the former, butanol was sprayed on the cake, while ethanol and diesel oil were sprayed when using the latter. As shown, the spray technique further reduced the cake moisture substantially.

TABLE 14

Effects of Spraying Different Reagents Over Filter Cake When Using Sorbitan Monooleate and TDDP as Dewatering Aids Moisture Content (% wt.)

| Reagent | Sorbitan Monooleate | | Tridecyldihydrogenphosphate (TDDP) | | | |
|---|---|---|---|---|---|---|
| Dosage (lbs/ton) | No Spray | Butanol Spray | No Spray | Diesel Spray | Ethanol Spray | Butanol Spray |
| 0 | 23.1 | 18.1 | 22.3 | 20.7 | 20.1 | 17.4 |
| 1 | 13.8 | 8.3 | 12.4 | 11.9 | 11.4 | 7.3 |
| 2 | 12.2 | 7.1 | 11.8 | 10.0 | 9.5 | 6.2 |
| 3 | 10.1 | 6.1 | 10.3 | 8.5 | 8.1 | 5.2 |
| 5 | 9.7 | 5.6 | 10.0 | 7.7 | 6.9 | 4.8 |

Example 15

In this example, the methods of applying vibration and spraying surface tension lowering reagents, as disclosed in Examples 13 and 14, respectively, were combined to be able to obtain low cake moistures at large cake thicknesses. The tests were conducted using a 2.5-inch diameter Buchner funnel with its height extended to 6 inches, so that 300 ml of coal slurry at 18% solids could be filtered in each test. This allowed the cake thickness to be increased to 1.2 inches. The coal sample used in these experiments were a dense-medium product from Massey Coal Company, which was crushed and wet-ground in a ball mill to obtain a 0.6 mm×0 fraction. The fine coal was floated using 1 lb/ton kerosene and 100 g/ton MIBC to obtain a feed to the filtration experiments. The tests were conducted at varying amounts of TDDP and 5 minutes of drying cycle time. It can be seen that the combined use of i) low HLB surfactant in diesel oil, ii) butanol spray, and iii) mechanical vibration achieved very low moistures at an industrial cake thickness of 1.2 inches.

TABLE 15

Effects of Using Reagent Spray, Vibration, and a Combination There of at 1.2-inch Cakes Thickness Using TDDP

| Reagent | Moisture Content (% wt) | | | |
|---|---|---|---|---|
| Dosage (lbs/ton) | None | Spray | Vibration | Spray and Vibration |
| 0 | 25.6 | 22.4 | 22.2 | 20.0 |
| 1 | 18.2 | 14.3 | 14.5 | 12.3 |
| 2 | 15.8 | 12.0 | 12.7 | 10.1 |
| 3 | 14.9 | 11.0 | 10.8 | 8.8 |
| 5 | 14.7 | 10.8 | 10.6 | 8.1 |

Example 16

Surprising results were obtained when the low HLB surfactants disclosed in the present invention were used in conjunction with electrolytes. It appears that the use of electrolytes can substantially decrease the amount of the surfactant needed to achieve a given level of moisture reduction. Table 16 shows the results of a series of vacuum filtration tests conducted using TDDP in the presence of aluminum chloride, chromium chloride, and copper nitrate. Before filtration, each coal sample (0.2 mm×0 flotation product) was conditioned with a known amount of electrolyte for 5 minutes. A known amount of TDDP dissolved in diesel oil (in 1:2 volume ratio) was then added and conditioned for another 2 minutes. The conditioned coal slurry was poured into a 2.5-inch diameter Buchner funnel for filtration experiments at 25-inch vacuum pressure, 2 min drying cycle time, and 0.4 inch cake thickness. The coal sample was received from Massey Coal Company, West Virginia.

The results show that in the presence of the electrolytes the amount of TDDP required was substantially reduced. For example, 3 lb/ton the reagent was required to achieve 16.0% cake moisture. In the presence of 10 g/ton aluminum chloride and chromium chloride, however, only 0.5 lb/ton TDDP was required to obtain similar (16.3 and 16.0%) cake moistures. In the presence of 50 g/ton copper nitrate, cake moisture of 16.2% was obtained at 1 lb/ton TDDP. Thus, electrolytes of trivalent cations seem to be more efficient than those of divalent cations. It is possible that the cations introduced with the electrolyte coagulate coal particles, which in turn results in a decrease in the population of micropores in filter cake.

TABLE 16

Effects of Using Electrolytes for the Filtration of a Bituminous Coal (0.2 mm × 0)

| Reagent | Moisture Content (% wt.) | | | |
|---|---|---|---|---|
| Dosage (lb./ton) | None | $Al^{3+}$ (10 g/ton) | $Cr^{3+}$ (10 g/ton) | $Cu^{2+}$ (50 g/ton) |
| 0 | 28.1 | 23.2 | 23.0 | 23.4 |
| 0.25 | 22.5 | 18.2 | 17.6 | 18.4 |
| 0.5 | 20.6 | 16.3 | 16.0 | 17.2 |
| 1 | 19.3 | 15.4 | 15.2 | 16.2 |
| 2 | 17.2 | 14.2 | 14.7 | 15.4 |
| 3 | 16.0 | 13.6 | 14.2 | 15.3 |
| 5 | 14.6 | 13.5 | 13.8 | 14.8 |
| pH | 7.5 | 5.5–7.5 | 5.5–7.5 | 4.5–6.5 |

Example 17

The objective of this example is to demonstrate that combination of several different methods disclosed in this invention can be used to achieve high levels of moisture reduction at a cake thickness of approximately 1 inch. A series of vacuum filtration experiments were conducted using different combinations of i) a low HLB surfactant (sorbitan monooleate) mixed with an appropriate carrier solvent, ii) an electrolyte (10 g/ton aluminum chloride), iii) spray of a surface tension lowering reagent (2–3 lb/ton butanol), and/or iv) mechanical vibration. The tests were conducted on a foltation product (0.6 mm×0) using a specially designed Buchner funnel that can handle large volumes of coal slurry, as described in Example 15. The coal sample was a dense-medium product from the Middle Fork coal preparation plant. It was crushed, ground, and floated using 1 lb/ton kerosene and 100 g/ton MIBC. The results, given in Table 17, show that almost any level of cake moisture can be achieved at an industrial cake thickness by combining the various methods disclosed in the present invention. For example, 14.2% cake moisture can be achieved using only 0.25 lb/ton sorbitan monooleate, 10 g/ton aluminum chloride, 2 to 3 lb/ton butanol, and mechanical vibration.

TABLE 17

Effects of Using Electrolyte, Regent Spray, and Vibration on the Filtration of a Middle Fork Coal (0.6 mm × 0) at 1-inch Cake Thickness Using Sorbitan Monooleate as a Dewatering Aid

| Reagent Addition (lb./ton) | Moisture Content (% wt.) | | | |
|---|---|---|---|---|
| | None[1] | [2]Al$^{3+}$ | [2]Al$^{3+}$ and Spray[3] | [2]Al$^{3+}$, Spray[3] and Vibration[4] |
| 0 | 25.2 | 22.8 | 21.0 | 18.7 |
| 0.25 | 20.1 | 18.0 | 16.7 | 14.2 |
| 0.5 | 18.7 | 15.2 | 13.6 | 11.7 |
| 1 | 16.2 | 14.3 | 12.5 | 10.2 |
| 2 | 15.3 | 13.6 | 11.7 | 9.5 |
| 3 | 14.7 | 13.2 | 10.6 | 8.2 |
| 5 | 13.8 | 13.0 | 10.3 | 7.4 |

[1]sorbitan monooleate in diesel oil (1:2);
[2]aluminum chloride (10 g/ton);
[3]butanol (2-3 lb/ton);
[4]mechaical vibration Example 18

It has been shown in Example 7 that the use of PMCH dissolved in a suitable solvent such as diesel oil gives superior results as compared to the case of using it directly. It will be shown that the use of PMCH in vegetable oils further improves its performance. To demonstrate this, a series of filtration tests were conducted on a bituminous coal from Massey coal company, West Virginia, using a 2.5-inch pressure filter at 100 kPa of air pressure. The coal sample was a flotation product (5 mm×0) obtained directly from an operating plant. It contained considerable amount of clay and other ash-forming minerals that have not been completely removed. Also, the sample was oxidized to some extent. The tests were conducted at a 0.5-inch cake thickness and a 2 min drying cycle time using: i) soybean oil dissolved in diesel oil in 1:2 volume ratio, ii) PMCH dissolved in diesel oil in the same manner, and iii) PMCH dissolved in soybean oil and diesel oil. The molecular weight of the PMCH used in this example was 2,900. The results given in Table 18 show that the combined use (Case iii) exhibited a synergistic effect in that the results are superior to the Case i or ii.

As has already been discussed in the present invention, the role of PMCH is a hydrophobizing agent that can reduce the capillary pressure and facilitate the process of dewatering. It is possible that the triacylglycerols present in the vegetable oil may act as additional hydrophobizing agents.

TABLE 18

Effects of Using PMCH in a Mixed Diesel Oil-Soybean Oil Solvent for the Filtration of a Bituminous Coal (0.5 mm × 0) at 0.5-inch Cake Thickness

| Reagent Addition (lb./ton) | Moisture Content (% wt.) Reagent Type | | |
|---|---|---|---|
| | Soy Bean Oil | Polymethyl Hydrosiloxane | Combination |
| 0 | 27.5 | 27.5 | 27.5 |
| 1 | 22.6 | 21.5 | 20.8 |
| 2 | 21.0 | 20.4 | 18.5 |
| 3 | 20.3 | 19.6 | 16.7 |
| 5 | 20.7 | 19.8 | 14.2 |

Example 19

Many of the examples given hitherto give evidence that the low HLB surfactants work well only when the particles to be dewatered are reasonably hydrophobic. The use of the surfactants in the manner described in the instant invention further enhances the hydrophobicity close to the level that is conducive for spontaneous removal of surface water. The hydrophobicity of the particles produced from flotation is usually not high enough for the spontaneous removal of water. In order to demonstrate these points clearly, a series of dewatering tests were conducted with a 0.038 mm×0 silica sample. A 2.5-inch diameter Buchner funnel was used for two sets of vacuum filtration tests at 25 inches Hg, 2 min drying cycle time, and 0.45 inches cake thickness. The results are given in Table 19.

The first series of tests were conducted using various amounts of sorbitan monooleate (Span 80) dissolved in diesel oil. These reagents were used as a 1:2 mixture by volume. In the absence any dewatering aid, the cake moisture was 26.1% and the cake formation time was 158 seconds. At 2 lb/ton Span 80, the moisture was reduced to 20.9% and the cake formation time increased to 179 seconds. The moisture reduction is not as good as those obtained in other examples with hydrophobic particles. Probably, the relatively small moisture reduction is due to the surface tension lowering. The next series of tests were conducted on the silica sample floated using 200 g/ton of dodecylammonium hydrochloride as collector at pH.9.5. The hydrophobization by the collector coating reduced the cake moisture from 26.1 to 18.9% and the cake formation time from 158 seconds to 27 seconds. When the low HLB surfactant was added to the floation product, the moisture was further reduced. At 2 lb/ton Span 80, the cake moisture was reduced to 8.4% and the cake formation time to 18 seconds. The improved dewatering brought about by the low HLB surfactants is most likely due to the hydrophobicity enhancement.

TABLE 19

Effects of Hydrophobizing a Silica Sample (0.038 mm × 0) before Using Sorbitan Monooleate as a Dewatering Aid

| Reagent | w/o Flotation | | w/ Flotation | |
|---|---|---|---|---|
| Dosage (lb/ton) | Moisture Content (% wt) | Cake Form. Time (sec) | Moisture Content (% wt) | Cake Form. Time (sec) |
| 0 | 26.1 | 158 | 18.9 | 27 |
| 0.5 | 22.6 | 152 | 11.2 | 21 |
| 1 | 20.9 | 167 | 9.4 | 20 |
| 2 | 20.7 | 175 | 8.4 | 18 |
| 3 | 20.9 | 179 | 8.6 | 18 |

Example 20

In the kaolin clay industry, fine clay is dewatered using vacuum drum filters. The cake natural gas flame, so that range of 55 to 60%. Typically, part of the filter cake is spray dried in a natural gas flame, so that it can be added to the wet cake to obtain a 70 to 75% solids slurry. The spray drying is costly, but it is the only way to produce highly loaded slurries for shipping. In this example, a series of filtration tests were conducted on a Brazilian clay (80% finer than 2μm, using the method disclosed in Example 19. The sample was floated using 700 g/ton dodecylammonium hydrochloride and 120 g/ton MIBC. The pH was adjusted to 9.3 using lime. The flotation product was subjected to vacuum filtration tests using a 2.5-inch diameter Buchner funnel at 25 inches Hg, 0.36 inches cake thickness and 3 min drying cycle time. As shown in Table 20, the cake moisture was 50.4% and the cake formation time was 39.4 minutes, when no dewatering aid was used. At 7 lb/ton sorbitan monooleate (Span 80), the moisture content was reduced to 28.6%, and the cake formation time was reduced to 18.4 minutes. These results suggest that the dewatering methods disclosed in the instant invention may be able to eliminate the use of spray dryers in the clay industry. With further optimization of the process, the reagent consumption can be reduced to significantly lower than used in the present example.

TABLE 20

Effect of Hydrophobizing a Brazilian Kaolin Clay Sample before Using Sorbitan Monooleate as a Dewatering Aid

| Reagent Dosage (lb/ton) | Moisture Content (% wt) | Cake Form. Time (Min.) |
| --- | --- | --- |
| 0 | 50.4 | 39.5 |
| 1 | 46.2 | 34.2 |
| 2 | 39.1 | 26.3 |
| 3 | 33.9 | 20.2 |
| 5 | 30.2 | 19.2 |
| 7 | 28.6 | 18.4 |

I claim:

1. A process for dewatering a slurry of hydrophilic particulate material comprising:
    initially hydrophobizing said material using a surfactant of HLB number grater than or equal to 15;
    adding a nonionic surfactant of HLB number less than 15 dissolved in at least one organic solvent;
    agitating said slurry to allow for said nonionic surfactant to adsorb on the surface of said initially hydrophobized material so that its hydrophobicity is further increased; and
    subjecting the agitated slurry containing said material to a mechanical method of dewatering.

2. The process of claim 1 wherein said particulate material comprises particles of less than 2 mm in size.

3. The process of claim 1 wherein the said mechanical method of dewatering is selected from the group consisting of: vacuum filtration, pressure filtration, centrifugal filtration, and centrifugation.

4. The process of claim 1 wherein said nonionic surfactant is selected from the group consisting of: fatty acids, fatty esters, phoshate esters, hydrophobic polymers, ethers, glycol derivatives, sarcosine derivatives, silicon-based surfactants and polymers, sorbitan derivatives, sucrose and glucose esters and derivatives, lanolin-based derivatives, glycerol esters, ethoxylated fatty esters, ethoxylated amines and amides, ethoxylated linear alcohols, ethoxylated tryglycerides, ethoxylated vegetable oils, and ethoxylated fatty acids.

5. The process of claim 4 wherein said nonionic surfactant is blended with an oil of vegetable origin.

6. The process of claim 1 wherein said organic solvent includes a solvent selected from the group consisting of: light hydrocarbon oils and short-chain alcohols.

7. The process of claim 6, wherein said light hydrocarbon oils are selected from diesel oil, kerosene, gasoline, petroleum distillate, turpentine, naphtanic oils, and oils of vegetable origin.

8. The process of claim 6, wherein said short-chain alcohols have carbon atom numbers less than eight.

9. A process for dewatering a slurry of hydrophilic particulate material comprising:
    initially hydrophobizing said material using a surfactant;
    adding a nonionic surfactant of HLB number less than 15 dissolved in at least one organic solvent;
    agitating said slurry to allow for said nonionic surfactant to adsorb on the surface of said initially hydrophobized material so that its hydrophobicity is further increased; and
    subjecting the agitated slurry containing said material to a mechanical method of dewatering, wherein said hydrophilic particulate material is a sulfide mineral and said surfactant that is used for the initial hydrophobization step is a thiol collector.

* * * * *

UNITED STATES PATENT AND TRADEMARK OFFICE
CERTIFICATE OF CORRECTION

PATENT NO. : 6,855,260 B1
DATED : February 15, 2005
INVENTOR(S) : Yoon

It is certified that error appears in the above-identified patent and that said Letters Patent is hereby corrected as shown below:

Column 23,
Line 26, delete the word "grater" and insert the word -- greater --.

Signed and Sealed this

Tenth Day of May, 2005

JON W. DUDAS
*Director of the United States Patent and Trademark Office*